United States Patent [19]
Golden

[11] Patent Number: 5,549,075
[45] Date of Patent: Aug. 27, 1996

[54] AUTOMATIC BIRD FEEDER

[76] Inventor: James B. Golden, 2631 N. Lehman Rd., Peoria, Ill. 61604

[21] Appl. No.: 336,419

[22] Filed: Nov. 9, 1994

[51] Int. Cl.⁶ .................................................. A01K 39/012
[52] U.S. Cl. ...................................... 119/57.92; 119/57.8
[58] Field of Search ............................. 119/51.11, 52.2, 119/57.1, 57.8, 57.92

[56] References Cited

U.S. PATENT DOCUMENTS

| | | |
|---|---|---|
| 1,981,454 | 11/1934 | Kay . |
| 2,630,906 | 3/1953 | Philipp . |
| 3,033,163 | 5/1962 | Hostetler et al. . |
| 3,653,361 | 4/1972 | Holliday ................... 119/57.8 |
| 3,962,996 | 6/1976 | Jones et al. ............... 119/61 X |
| 4,844,017 | 7/1989 | Lackner ..................... 119/52.2 |
| 5,339,767 | 8/1994 | Krag ........................ 119/57.8 |
| 5,438,956 | 8/1995 | Thigpen .................... 119/57.92 |

FOREIGN PATENT DOCUMENTS 3738156  10/1988  Germany ............................ 119/51.11

*Primary Examiner*—Robert P. Swiatek
*Attorney, Agent, or Firm*—Seyfarth, Shaw, Fairweather & Geraldson

[57] ABSTRACT

An automatic bird feeder comprised of a storage container for feed, a hole or opening in the storage container for adding feed to the storage container, a feeder positioned above the storage container, a feed tube connecting the storage container with the feeder, the feed tube having a slot therein through which feed may enter the feed tube from the storage container, a drive unit, an augur or telescoping shaft located within the feed tube, wherein the augur or telescoping shaft conveys feed from the storage container to the feeder when the drive unit is activated, and an electronic sensor device in the feeder to detect the level of feed present in the feeder.

7 Claims, 3 Drawing Sheets

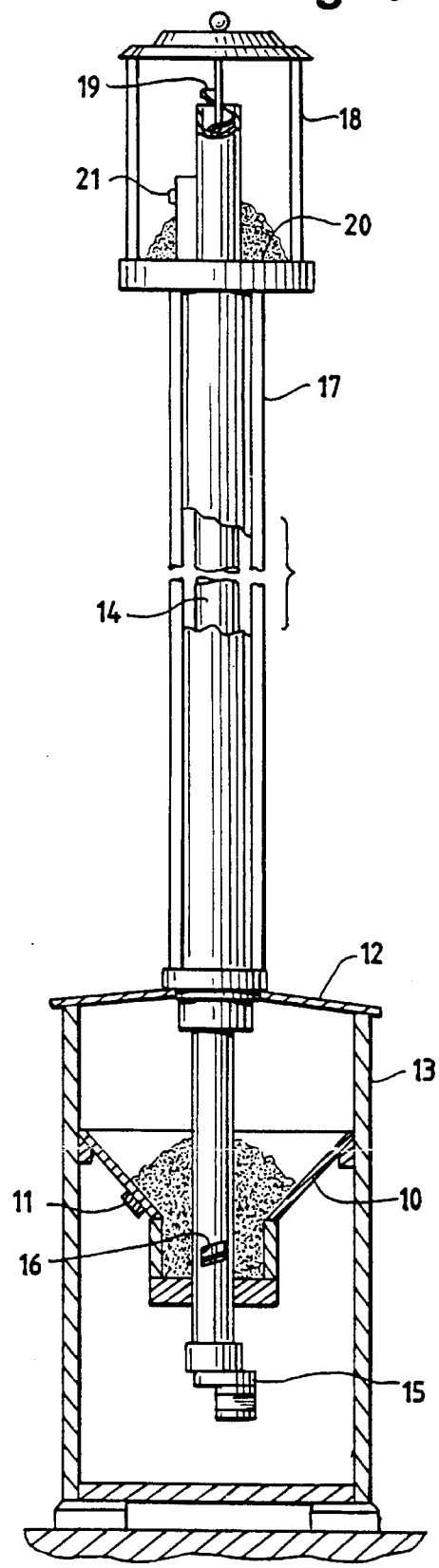
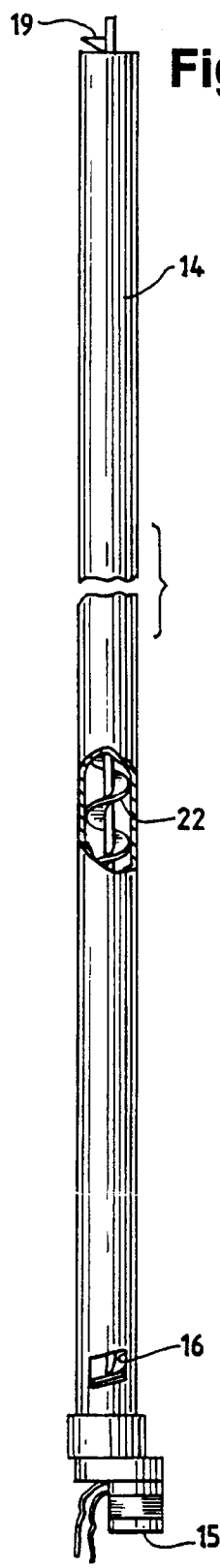
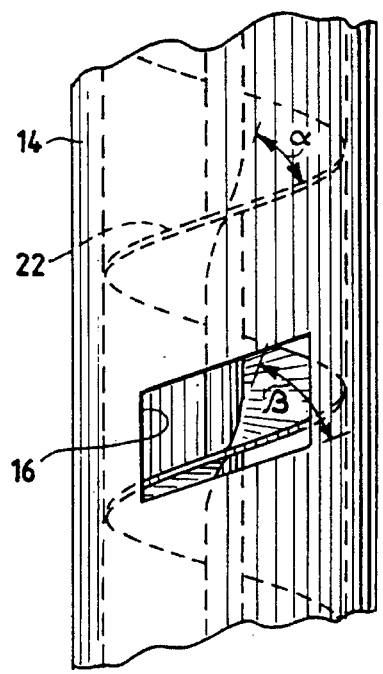

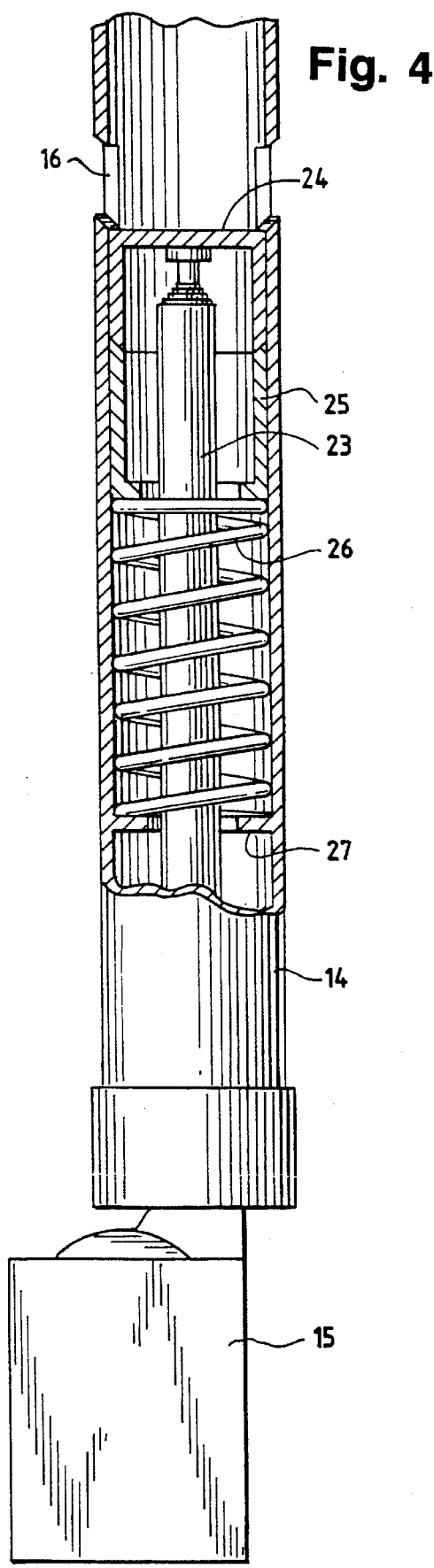
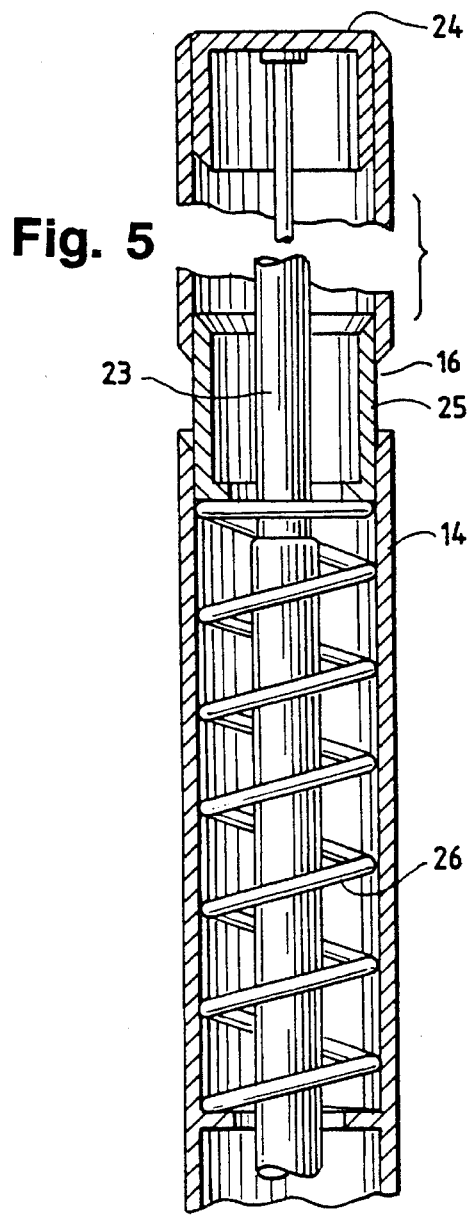

AUTOMATIC BIRD FEEDER

This invention relates to a bird feeder, and more particularly to an automatic bird feeder that permits a large quantity of bird feed to be stored in a storage bin at its base and automatically conveyed up to a feed platform when needed.

BACKGROUND OF INVENTION

Bird feeders known in the art must generally be refilled regularly. Filling a bird feeder can be an unpleasant task, especially in inclement weather. An automatic bird feeder which attempts to address this problem is disclosed in U.S. Pat. No. 3,653,361 to Holliday. This feeder is comprised of an underground storage tank, a bird feeder, a screw conveyor which carries feed up from the storage tank to the feeder, and pendulum operated switches in the feeder and in the underground storage tank. The feeder disclosed in the Holliday patent has mechanical parts, such as the pendulum switches, which may wear out or fail in inclement weather. In addition, because the storage tank is buried in the ground, access to the storage tank may be difficult in inclement weather.

It is, therefore, an object of the present invention to provide an automatic bird feeder which permits a large quantity of bird feed to be stored therein, permitting refilling of the feeder to be scheduled for the most favorable conditions.

SUMMARY OF THE INVENTION

This object and others are achieved by the automatic bird feeder of the present invention which is comprised of a storage container, a feed tube, a bird feeder, a means for conveying bird feed from the storage container up through the feed tube into the bird feeder, and electronic sensors in the feeder and the storage container. The means for conveying bird feed from the storage container up through the feed tube into the bird feeder may be an auger means, or it may be a telescoping shaft means. If an auger means is used, the angle of the auger should be approximately the same as the angle of slide of the bird feed to be conveyed up the auger.

Further objects, features, and advantages of the invention will become evident from a consideration of the following detailed description when taken in conjunction with the accompanying drawings and the appended claims.

BRIEF DESCRIPTION OF THE DRAWINGS

For the purpose of facilitating an understanding of the invention there is illustrated in the accompanying drawings a preferred embodiment thereof, from an inspection of which, when considered in connection with the following description, its construction and operation, and many of its advantages should be readily understood and appreciated.

FIG. 1 is a plane view of an automatic bird feeder of the present invention in which a section has been broken away for clarity.

FIG. 2 is a partial perspective view of one embodiment of the present invention in which a section has been broken away for clarity.

FIG. 3 is an enlarged cut-away view of a portion of FIG. 2.

FIG. 4 is a partial plane view of another embodiment of the present invention in which a section has been broken away for clarity.

FIG. 5 is an alternate view of the embodiment shown in FIG. 4.

DETAILED DESCRIPTION OF THE PREFERRED EMBODIMENTS

Figure 6:
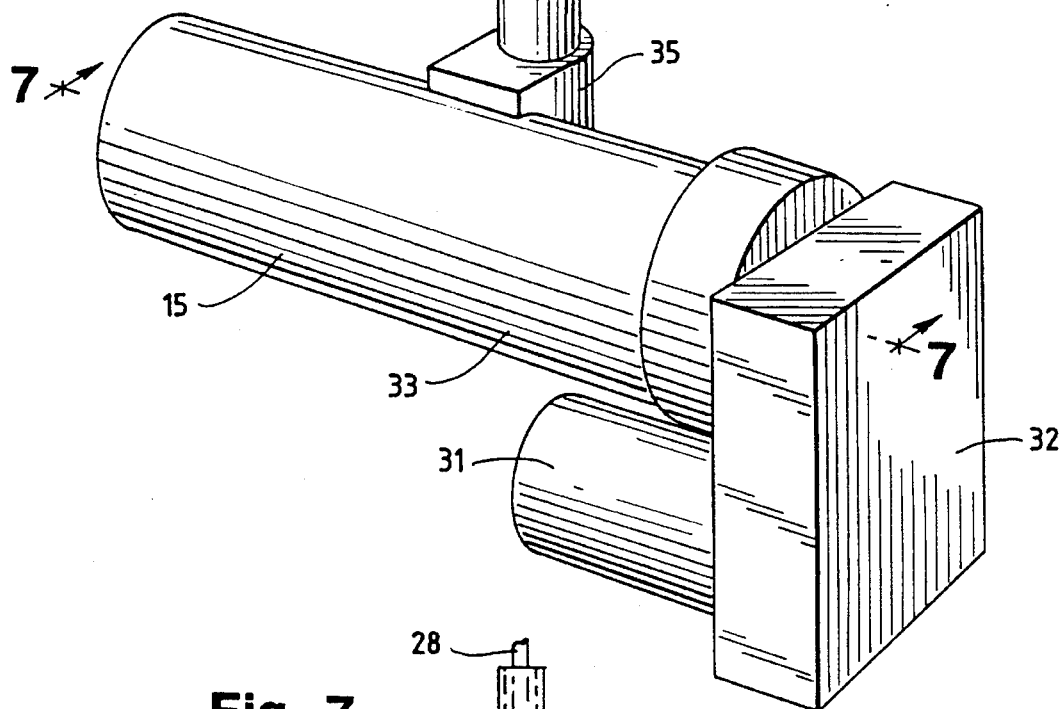
FIG. 6 is a partial perspective view of an embodiment of the present invention.

A bird feeder according to the present invention is shown in FIG. 1. A storage bin 10 for storing feed may be located within a housing 13, as shown in FIG. 1, or the housing 13 may serve as the storage container for feed. The storage container is equipped with a means for adding feed to the storage container, such as a hole in the top of the storage container covered with a removable plug or cover. In the preferred embodiment shown in FIG. 1, the storage bin 10 may be filled with bird feed by opening the lid 12 of the housing 13. An electronic sensor 11 is positioned in communication with the storage bin 10 to detect the presence or absence of feed in the storage bin 10. A feed tube 14 extends upward from a drive unit 15 within the housing 13 to a bird feed discharge 19 in a bird feeder 18. The feed tube 14 may act as a support for the bird feeder 18, or it may be located within a bird feeder support tower 17, as shown in FIG. 1, such that the bird feeder support tower 17 provides structural support for the bird feeder 18 and protects the feed tube 14 from exposure to external forces. Bird feed enters the feed tube 14 through a slot 16. When additional feed is needed in the bird feeder 18, feed is conveyed up through the feed tube 14 by a telescoping shaft means, as illustrated in FIGS. 4 and 5, or by an auger means, as illustrated in FIGS. 2 and 3. The conveying means is driven by the drive unit 15 located within the housing 13. Electrical power to operate the installation may be supplied by an electrical utility or by a self-contained solar electrical power system with storage battery back up.

As illustrated in FIG. 1, bird feed is dispensed from the feed platform 20 of the bird feeder 18. A sensor 21 in the bird feeder 18 detects the level of bird feed in the bird feeder 18. The sensor 21 may be of any type. In a preferred embodiment, the sensor 21 is a light sensing device that deactivates the drive unit when bird feed covers the sensor 21 and blocks out daylight. In an alternate preferred embodiment, an ultrasonic type sensor 21 may be used. When additional feed is needed, a signal is sent from the sensor 21 in the bird feeder 18 to the drive unit 15. The drive unit 15 is then activated, and feed is conveyed upward from the storage bin 10 through the feed tube 14 and discharged from the bird feed discharge 19 into the bird feeder 18. When the bird feeder 18 is full, a signal is sent from the sensor 21 to the drive unit 15 and the drive unit is deactivated.

The drive unit 15 is protected from extended operation without feed in the storage bin 10 by a sensor 11 positioned in communication with the storage bin 10, by a timer that limits the duration of the duty cycle of the motor, or by motor design. In a preferred embodiment, a sensor 11 detects the presence or absence of bird feed in the storage bin 10, and, if no feed is detected in the storage bin 10, the sensor 11 sends a signal to the drive unit 15 which prevents the drive unit 15 from activating. If a sensor 11 is used, it may be an ultrasonic type sensor or it may be a sensor of other known types.

In FIG. 2, an auger conveyer is used to convey the feed up through the feed tube into the bird feeder. As shown in FIGS. 2 and 3, the auger conveyer 22 picks up feed through a slot 16 which is cut into the feed tube 14 on an angle. The angle of the auger 22 (the angle α between the top of the auger blade and the central shaft) should be approximately the same as, or slightly less than, the angle of slide of the feed to be conveyed up the feed tube 14, and the angle of the slot 16 (the angle β between the bottom of the slot 16 and the central shaft) should correspond to the angle of the auger 22. In a preferred embodiment, the coefficient of friction of the internal diameter of the feed tube 14 is enhanced to provide a component of force to convey the bird feed up auger 22 as it rotates. In addition, the diameter of the feed tube 14 should be proportional to the amount of bird feed to be conveyed up the feed tube; if the tube 14 is proportionately too large, the friction between the feed and the inside of the tube may be insufficient to convey the feed up the tube. As the auger 22 rotates, feed is picked up through the feed slot 16 and carried up through the feed tube 14 to the feed discharge 19, in the bird feeder 18.

An alternate embodiment of the conveying means is shown in FIG. 4. In this embodiment, a telescoping shaft 23 moves a feed piston 24 upward through the feed tube 14 into the bird feeder 18 to refill the bird feeder 18. The feed piston 24 travels the entire length of the feed tube 14, powered by the extension or retraction of the telescoping shaft 23. In the retracted position, shown in FIG. 4, the feed piston 24 is positioned below the feed slot 16 in the feed tube 14. This permits feed to be loaded on top of the piston 24. After a delay to permit feed to flow into the feed tube 14, the cable drive unit 15 is energized and the telescoping shaft 23 is extended, as shown in FIG. 5. As the telescoping shaft 23 is extended, the piston 24 is moved upward to the top end of the tube 14, where the feed is discharged into the bird feeder 18. After a delay to permit the feed to be discharged, the cable drive unit 15 is energized in the reverse direction, and pulls the feed piston 24 back to the loading position.

Feed is prevented from entering the feed tube 14 through the feed slot 16 while the telescoping shaft 23 is extended by a feed slot shutter 25. In a preferred embodiment, the feed slot shutter 25 is attached to the upper end of a spring 26 which is fixedly attached at its lower end 27 to the feed tube 14. When the telescoping shaft 23 is retracted, the spring 26 is compressed below the feed piston 24 such that the feed slot shutter 25 is positioned below the feed slot 16, as shown in FIG. 4. As the feed piston 24 moves upward, the spring 26 causes the feed slot shutter 25 to follow the feed piston 24 until the feed slots 16 are closed. Travel of the feed slot shutter 25 is limited by natural extension of the spring 26 or by a mechanical limit to the spring's travel. When the telescoping shaft 23 is retracted, as the feed piston 24 approaches load position it engages the feed slot shutter 25 and pushes it down, thus opening the feed slot 16 and compressing the spring 26.

Figure 7:
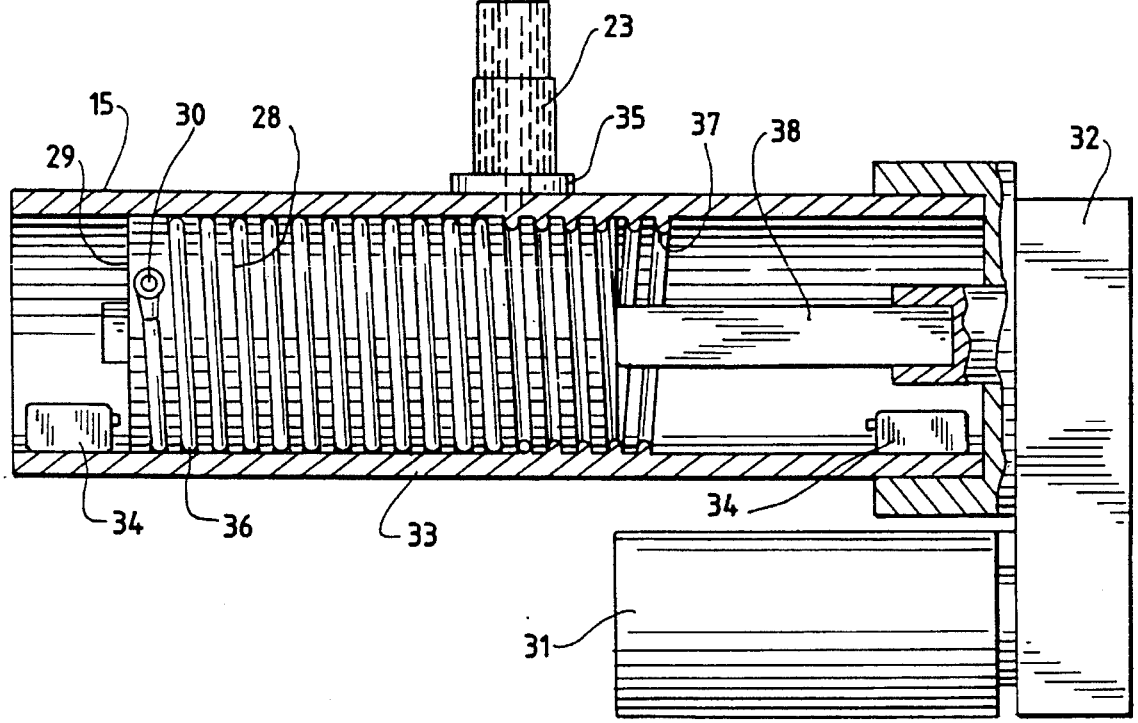
FIG. 7 is a cross-sectional view of the embodiment shown in FIG. 6.

A cable drive unit 15 that may used to extend and retract the telescoping shaft 23 is shown in FIGS. 6 and 7. The cable drive unit 15 comprises an electric motor 31 and gear reducer 32 mounted to a cylindrical cable unit 33. The telescopic shaft 23 extends or retracts tangentially to the cable drum 29 from a boss 35 on the cylindrical cable unit 33.

The interior of the cable unit 33 is shown in FIG. 7. The cable 28 leaves the cable unit 33 near the center of the cable unit 33. The cable 28 is aligned within a threaded portion 36 of the cable drum 29. The threaded portion 36 of the cable drum 29 extends past the section occupied by the cable 28, ending at the right hand side of the cable drum 29. The threads 36 on the cable drum 29 engage similar threads 37 on the inside diameter of the cable drum housing 33.

As the drive shaft 38 rotates the cable drum 29, the cable drum 29 slides on the drive shaft 38 and moves to the right or left due to the threads 36, 37 on the cable drum 29 and cable drum housing 33. When the cable drum 29 rotates in one direction, the cable 28 is unwound and forces the telescopic shaft 23 to extend the feed piston 24. When the drive reverses, the cable drum 29 rotates in the other direction, rewinding the cable 28 on the drum 29 and retracting the telescopic shaft 23 and feed piston 24.

Location of the start and stop position of the telescopic shaft 23 may be controlled by sensors 34 at each end of the cable drum housing 33, since the position of the cable drum 29 in the cable drum housing 33 is directly related to the length of cable 28 extended from the cable drum unit 33. Feed sensor and drive motor protection are essentially the same as described in the auger feed tube embodiment.

The invention has been described above in an illustrative manner and it is to be understood that terminology which has been used is intended to be in the nature of description rather than of limitation. Obviously, many modifications and variations of the present invention are possible in light of the above teachings. It is therefore to be understood that within the scope of the appended claims, the invention may be practiced otherwise than as specifically described.

What is claimed is:

1. An automatic feeder comprising:

a storage container;

means for adding feed to the storage container;

a feeder positioned above the storage container;

a feed tube connecting the storage container with the feeder, said feed tube having a slot therein through which feed may enter the feed tube from the storage container;

a telescoping cable conveying means located within the feed tube; and a drive unit to drive the telescoping cable conveying means, whereby the telescoping cable conveying means conveys feed from the storage container to the feeder when the drive unit is activated.

2. An automatic feeder according to claim 1, further comprising an electronic sensor device in the feeder to detect the level of feed present in the feeder.

3. An automatic feeder according to claim 1, further comprising an electronic sensor device in the storage container to detect the level of feed present in the storage container.

4. An automatic feeder comprising:

a storage container;

means for adding feed to the storage container;

a feeder positioned above the storage container;

an electronic sensor device in the feeder to detect the level of feed present in the feeder;

a feed tube connecting the storage container with the feeder, said feed tube having a slot therein through which feed may enter the feed tube from the storage container;

an auger conveying means located within the feed tube, wherein the angle of the auger is approximately the same as the angle of slide of the feed to be conveyed; and a drive unit within the storage container to drive the auger conveying means, whereby the auger conveying means conveys feed from the storage container to the feeder when the drive unit is activated.

5. An automatic feeder according to claim 4, wherein the slot in the feed tube is cut at an angle corresponding to the angle of the auger.

6. An automatic feeder according to claim 4, wherein the coefficient of friction on the internal diameter of the feed tube is enhanced.

7. An automatic feeder according to claim 4, further comprising an electronic sensor device in the storage container to detect the level of feed present in the storage container.

* * * * *